(12) United States Patent
Zhu et al.

(10) Patent No.: US 8,408,464 B2
(45) Date of Patent: Apr. 2, 2013

(54) AUTO-EXPOSURE METHOD USING CONTINUOUS VIDEO FRAMES UNDER CONTROLLED ILLUMINATION

(75) Inventors: Xiaoxun Zhu, Suzhou (CN); Ynjiun Paul Wang, Cupertino, CA (US)

(73) Assignee: Metrologic Instruments, Inc., Blackwood, NJ (US)

( * ) Notice: Subject to any disclaimer, the term of this patent is extended or adjusted under 35 U.S.C. 154(b) by 6 days.

(21) Appl. No.: 13/020,044

(22) Filed: Feb. 3, 2011

(65) Prior Publication Data

US 2012/0199654 A1     Aug. 9, 2012

(51) Int. Cl.
G06K 7/10     (2006.01)
G06K 9/24     (2006.01)
G08C 21/00     (2006.01)

(52) U.S. Cl. .................... 235/454; 235/455; 235/462.06; 235/462.32; 235/462.33

(58) Field of Classification Search .................. 235/454, 235/455, 462.06, 462.32–462.33
See application file for complete search history.

(56) References Cited

U.S. PATENT DOCUMENTS

| | | |
|---|---|---|
| 4,788,565 A | 11/1988 | Masuda et al. |
| 4,827,332 A | 5/1989 | Miyake et al. |
| 4,860,096 A | 8/1989 | Long et al. |
| 4,896,211 A | 1/1990 | Hunt et al. |
| 5,010,412 A | 4/1991 | Garriss |
| 5,159,398 A | 10/1992 | Maekawa et al. |
| 5,229,856 A | 7/1993 | Koshiishi |
| 5,410,225 A | 4/1995 | Ishii et al. |
| 5,428,392 A | 6/1995 | Castro et al. |
| 5,438,367 A | 8/1995 | Yamamoto et al. |
| 5,504,584 A | 4/1996 | Soeda |
| 5,539,456 A | 7/1996 | Ishii |
| 5,546,121 A | 8/1996 | Gotanda et al. |
| 5,550,595 A | 8/1996 | Hannah |
| 5,714,745 A * | 2/1998 | Ju et al. .......................... 235/469 |
| 6,135,354 A * | 10/2000 | Kubon ..................... 235/462.11 |
| 6,151,069 A | 11/2000 | Dunton et al. |
| 6,155,488 A | 12/2000 | Olmstead et al. |
| 6,230,975 B1 | 5/2001 | Colley et al. |
| 6,619,549 B2 | 9/2003 | Zhu et al. |
| 7,014,114 B2 | 3/2006 | Maiman |
| 7,053,954 B1 | 5/2006 | Canini |
| 7,128,266 B2 | 10/2006 | Zhu et al. |

(Continued)

*Primary Examiner* — Michael G Lee
*Assistant Examiner* — Laura Gudorf
(74) *Attorney, Agent, or Firm* — Summa, Additon & Ashe, P.A.

(57) ABSTRACT

An adaptive strobe illumination control process for use in a digital image capture and processing system. In general, the process involves: (i) illuminating an object in the field of view (FOV) with several different pulses of strobe (i.e. strobo-scopic) illumination over a pair of consecutive video image frames; (ii) detecting digital images of the illuminated object over these consecutive image frames; and (iii) decode processing the digital images in an effort to read a code symbol graphically encoded therein. In a first illustrative embodiment, upon failure to read a code symbol graphically encoded in one of the first and second images, these digital images are analyzed in real-time, and based on the results of this real-time image analysis, the exposure time (i.e. photonic integration time interval) is automatically adjusted during subsequent image frames (i.e. image acquisition cycles) according to the principles of the present disclosure. In a second illustrative embodiment, upon failure to read a code symbol graphically encoded in one of the first and second images, these digital images are analyzed in real-time, and based on the results of this real-time image analysis, the energy level of the strobe illumination is automatically adjusted during subsequent image frames (i.e. image acquisition cycles) according to the principles of the present disclosure.

13 Claims, 13 Drawing Sheets

U.S. PATENT DOCUMENTS

| | | |
|---|---|---|
| 7,227,117 B1 | 6/2007 | Lackemann et al. |
| 7,461,790 B2 | 12/2008 | Mcqueen et al. |
| 7,464,877 B2 | 12/2008 | Kotlarsky et al. |
| 7,484,666 B2 | 2/2009 | Kotlarsky et al. |
| 7,494,065 B2 | 2/2009 | Barkan et al. |
| 7,841,533 B2 | 11/2010 | Kotlarsky et al. |
| 7,845,561 B2 | 12/2010 | Kotlarsky et al. |
| 8,047,438 B2 | 11/2011 | Kotlarsky et al. |
| 8,056,808 B2 | 11/2011 | Epshteyn |
| 8,083,147 B2 | 12/2011 | Aker et al. |
| 8,134,621 B2 | 3/2012 | Olmstead et al. |
| 8,146,821 B2 | 4/2012 | Barkan et al. |
| 8,157,174 B2 | 4/2012 | Kotlarsky et al. |
| 8,157,175 B2 | 4/2012 | Kotlarsky et al. |
| 8,167,210 B2 | 5/2012 | Liu et al. |
| 2006/0208083 A1* | 9/2006 | Kotlarsky et al. ........ 235/462.01 |
| 2007/0145136 A1* | 6/2007 | Wiklof et al. ................. 235/454 |
| 2008/0314985 A1 | 12/2008 | Kotlarsky et al. |
| 2009/0127342 A1 | 5/2009 | Giebel et al. |
| 2010/0302420 A1 | 12/2010 | Strat et al. |

\* cited by examiner

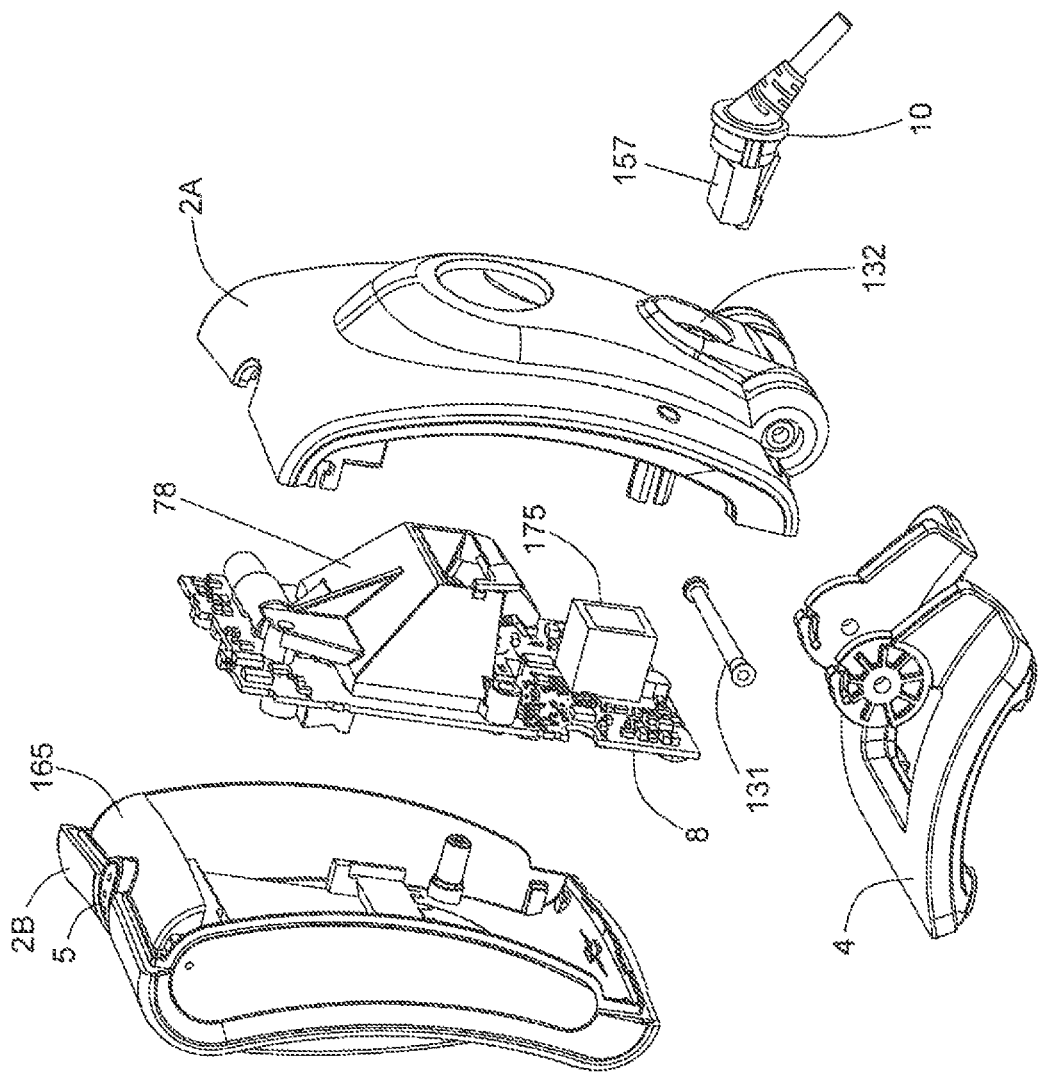

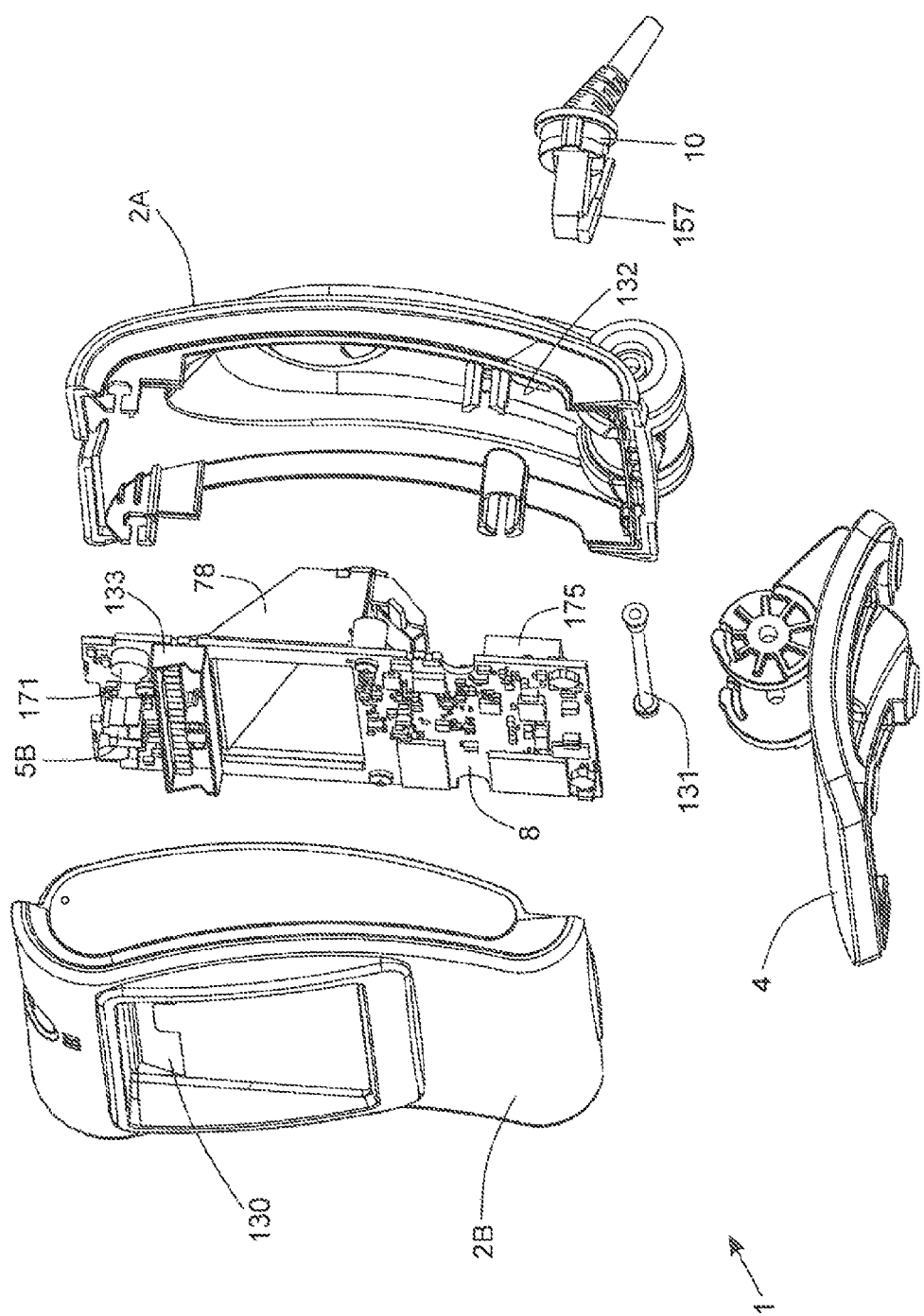

AUTO-EXPOSURE METHOD USING CONTINUOUS VIDEO FRAMES UNDER CONTROLLED ILLUMINATION

BACKGROUND OF INVENTION

1. Field of Disclosure

The present disclosure relates to digital image capture and processing systems employing improved methods of automatic illumination control during a continuous video image capture mode of operation.

2. Brief Description of the State of the Art

Auto-exposure methods used in imaging devices typically involve the steps of (a) acquiring an image with a certain exposure time, (b) analyzing the acquired image and (c) determining if an exposure period needs to be set, and (d) repeating these steps until the image exposure quality meets a predetermined threshold. In the case of imaging barcode scanners, sometimes the imager is running in video mode.

Therefore, if the previous exposure time is incorrect, while the computer is still analyzing the first acquired image, subsequent frame in the video is wasted since it is taken with the same exposure time. The resulting effect is a time-consuming auto-exposure method and at least one frame of the video is wasted.

U.S. Pat. No. 7,841,533 discloses hand-supportable digital-imaging code symbol reading devices employing improvements in automatic illumination and exposure control, in digital imaging applications. However, despite providing improvements in automatic illumination and exposure control, such techniques could still benefit from innovative adaptive measures which work to make digital-imaging based code symbol reading systems more responsive in demanding imaging environments.

Thus, there is a great need in the art for an improved method of and apparatus for reading code symbols using object illumination and imaging techniques which avoid the shortcomings and drawbacks of prior art methods and apparatus.

OBJECTS AND SUMMARY

Accordingly, a primary object of the present disclosure is to provide a novel digital image capture and processing system and method, which avoid the shortcomings and drawbacks of prior art methods and apparatus.

Another object is to provide a digital image capture and processing system having a digital image formation and detection subsystem, supporting a continuous video image capture mode, having a variable stroboscopically-pulsed illumination (i.e. strobe illumination) duration, synchronized with each image exposure period, so as to help provide an improved level of responsiveness while ensuring high-quality image capture performance.

Another object is to provide such a digital image capture and processing system, wherein its LED-based illumination subsystem has an array of LEDs, from which stroboscopically-pulsed (i.e. strobe) illumination is delivered to the field of view (FOV), while synchronized with the exposure period of each image capture frame.

Another object is to provide such a digital image capture and processing system, wherein the digital image formation and detection subsystem employs an optical band-pass filter designed to pass optical bandwidth of LED-based strobe illumination, during illumination transmission and collection operations, while blocking out optical components of ambient light residing outside the optical bandwidth of LED strobe illumination, thereby reducing the dynamic range of the image as well as improve the accuracy of exposure estimation based on previous images.

Another object is to provide a digital image capture and processing system, wherein upon detecting an object in the field of view (i.e. manually or automatically), the system commences its video image acquisition cycle by the LED array generating stroboscopically-pulsed illumination (i.e. strobe illumination) having energy levels that are significantly different for the first two digital image frames, so that the first strobe illumination is twice as bright as the second strobe illumination, and the first digital image is twice as bright as the second digital image in the video image stream; then these digital images are processed in an effort to read one or more code symbols graphically represented therein; and if successful, then the system returns to its initial detect object state.

Another object is to provide a digital image capture and processing system, wherein, according to a first illustrative embodiment, in the event that neither the first nor the second digital image captured by the system can be successfully decoded to read a bar code symbol, then the two digital images with different brightness levels are analyzed (in real-time) to determine a preferred exposure time duration, for subsequent video frames, based upon (i.e. depending on) whether both first and second digital images are too dark, too bright, or one image is too bright while the other image too dark.

Another object is to provide a digital image capture and processing system, wherein, according to a second illustrative embodiment, in the event that neither the first nor the second digital image captured by the system can be successfully decoded to read a bar code symbol, then the two digital images with different brightness levels are analyzed (in real-time) to determine a new strobe illumination energy level to enable the reading of code symbols graphically represented therein, without resetting the exposure time during subsequent image capture frames, based upon (i.e. depending on) whether the first and second digital images are too dark, or too bright, or whether one digital image is too bright and the other digital image is too dark.

These and other objects will become apparent hereinafter and in the claims appended hereto.

BRIEF DESCRIPTION OF THE DRAWINGS

For a more complete understanding of how to practice the objects, the following detailed description of the illustrative embodiments can be read in conjunction with the accompanying drawings, briefly described below.

FIG. 2A is a first perspective exploded view of the hand-supportable digital image capture and processing system of the illustrative embodiment illustrated in FIG. 1, and showing its PC board assembly arranged between the front and rear portions of the system housing, with the hinged base being pivotally connected to the rear portion of the system housing by way of an axle structure;

FIG. 2B is a second perspective/exploded view of the hand-supportable digital image capture and processing system of the illustrative embodiment of the present invention shown in FIG. 1;

DETAILED DESCRIPTION OF THE ILLUSTRATIVE EMBODIMENTS

Figure 1:
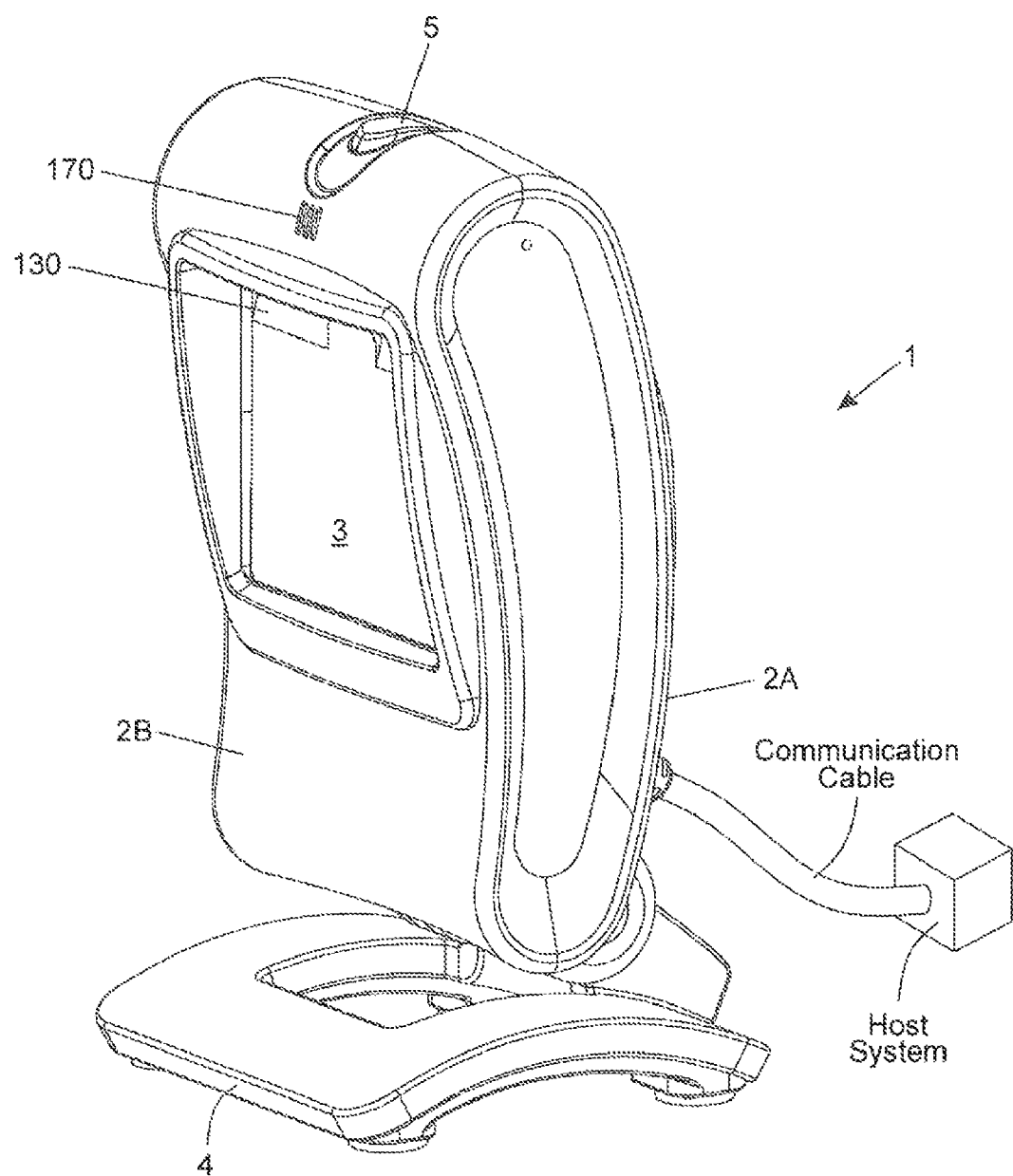
FIG. 1 is a perspective view of an illustrative embodiment of the hand-supportable digital image capture and processing system of the present disclosure, wherein its automatic object motion detection and analysis subsystem projects an IR-based illumination beam within the FOV of the system during its object detection mode, and where its LED-based illumination subsystem also employs an array of light emitting diodes (LEDs) to illuminate objects located anywhere within the working distance of the system.

Referring to the figures in the accompanying Drawings, the illustrative embodiments of the digital imaging-based bar code symbol reading system will be described in great detail, wherein like elements will be indicated using like reference numerals.

In general, two illustrative embodiments of the digital-imaging based bar code symbol reading system are described hereinbelow. In each illustrative embodiment, an adaptive strobe illumination and exposure control process is supported, which helps provide an improved level of snappiness and/or responsiveness to system performance.

As shown in FIGS. 1, 2A and 2B, the digital-imaging based bar code symbol reading system of the illustrative embodiment 1 comprises: a hand-supportable housing 2 having (i) a front housing portion 2B with a window aperture 6 and an imaging window panel 3 installed therein; and (ii) a rear housing portion 2A. As shown, a single PC board based optical bench 8 (having optical subassemblies mounted thereon) is supported between the front and rear housing portions 2A and 3B which, when brought together, form an assembled unit. A base portion 4 is connected to the assembled unit by way of a pivot axle structure 131 that passes through the bottom portion of the imager housing and the base portion so that the hand-supportable housing and base portion are able to rotate relative to each other. The host/imager interface cable 10 passes through a port 132 formed in the rear of the rear housing portion, and interfaces with connectors mounted on the PC board 8.

The hand-supportable digital-imaging based system 1 can be used in both hand-supportable and counter-top support-able modes of operation. When operated in its manually-triggered hand-supportable mode of operation, as shown in FIG. 4A, the system supports first and second manually-triggered modes of bar code symbol reading operation, specified in FIGS. 5 and 6, respectively. When operated in its automatically-triggered hand-supportable mode of operation, as shown in FIG. 4B, the system supports first and second automatically-triggered modes of bar code symbol reading operation, specified in FIGS. 7 and 8, respectively. When operated in its counter-top supportable mode of operation, the system supports an automatically-triggered mode of bar code symbol reading operation, allowing for full hands-free operation.

Figure 3:
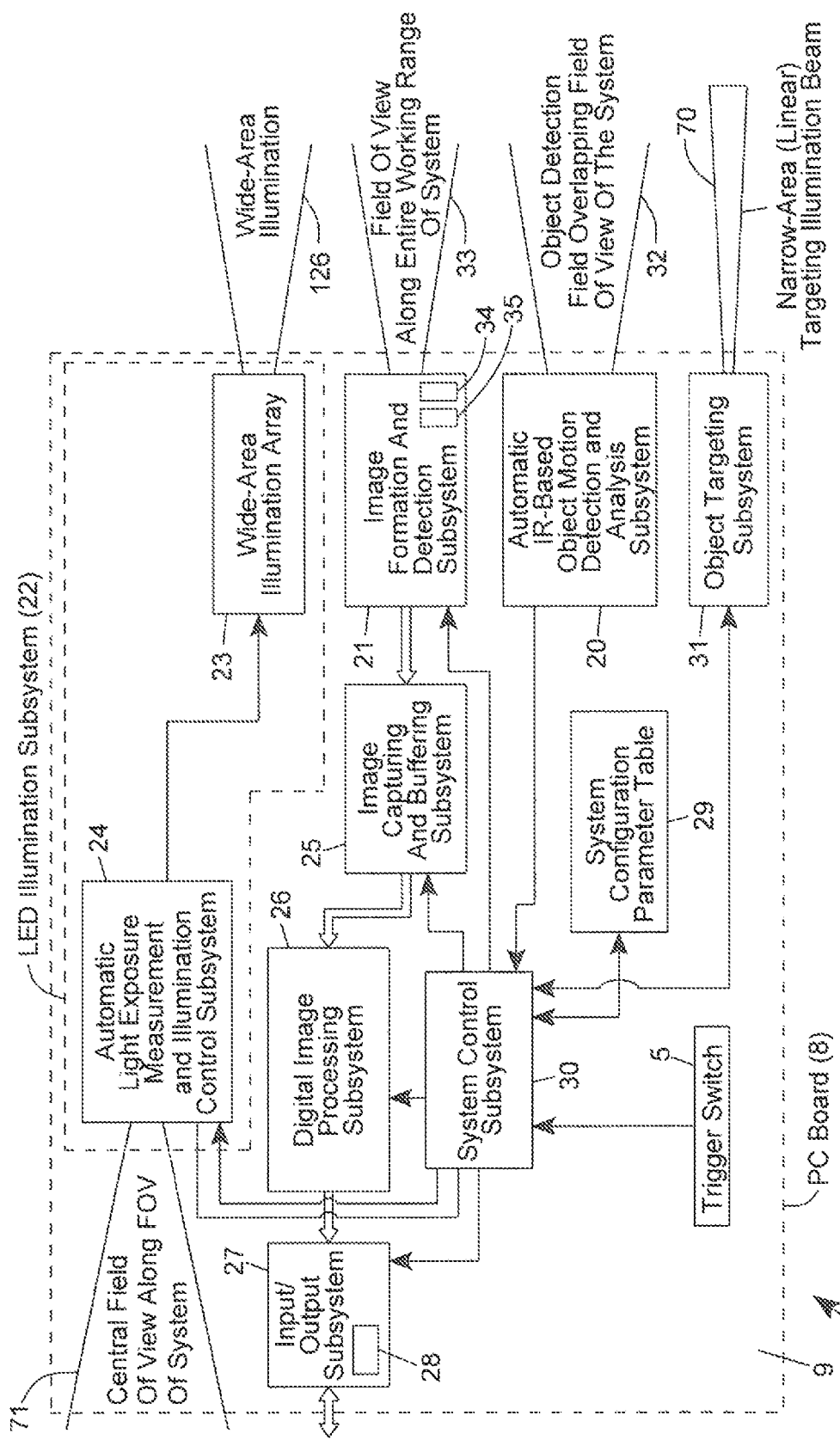
FIG. 3 is a schematic block system diagram for the hand-supportable digital image capture and processing system illustrated in FIGS. 1 through 2B.

As shown in FIG. 3, the digital-imaging based code symbol reading system 1 comprises a number of subsystem components, namely: an image formation and detection (i.e. camera) subsystem 21 having image formation (camera) optics 34 for producing a field of view (FOV) upon an object to be imaged and a CMOS or like area-type image detection array 35 for detecting imaged light reflected off the object during illumination operations in an image capture mode in which at least a plurality of rows of pixels on the image detection array are enabled; a LED-based illumination subsystem 22 employing a single LED illumination array 32 for producing a field of narrow-band wide-area illumination 126 within the entire FOV 33 of the image formation and detection subsystem 21, which is reflected from the illuminated object and transmitted through a narrow-band transmission-type optical filter 40 realized within the hand-supportable housing and detected by the image detection array 35, while all other components of ambient light are substantially rejected; an object targeting illumination subsystem 31 as described hereinabove; an IR-based object motion detection and analysis subsystem 20 for producing an IR-based object detection field 32 within the FOV of the image formation and detection subsystem 21; an automatic illumination and exposure control subsystem 24 for controlling the operation of the LED-based illumination subsystem 22 and exposure time period of the image detection array 35; an image capturing and buffering subsystem 25 for capturing and buffering 2-D images detected by the image formation and detection subsystem 21; a digital image processing subsystem 26 for processing 2D digital images captured and buffered by the image capturing and buffering subsystem 25 and reading 1D and/or 2D bar code symbols represented therein; an input/output subsystem 27 for outputting processed image data and the like to an external host system or other information receiving or responding device; and a system control subsystem 30 integrated with the subsystems above, for controlling and/or coordinating these subsystems during system operation.

The primary function of the object targeting subsystem 31 is to automatically generate and project a visible linear-targeting illumination beam 70 across the central extent of the FOV of the system in response to either (i) the automatic detection of an object during hand-held imaging modes of system operation, or (ii) manual detection of an object by an operator when s/he manually actuates the manually-actuatable trigger switch 5. In order to implement the object targeting subsystem 31, the OCS assembly 78 also comprises a fourth support structure for supporting the pair of beam folding mirrors above a pair of aperture slots. In turn, these aperture slots are disposed above a pair of visible LEDs arranged on opposite sites of the FOV optics 34 so as to generate a linear visible targeting beam 70 that is projected off the second FOV folding 75 and out the imaging window 3, as shown and described in detail in US Patent Publication No. US20080314985 A1, incorporated herein by reference in its entirety.

The primary function of the object motion detection and analysis subsystem 20 is to automatically produce an object detection field 32 within the FOV 33 of the image formation and detection subsystem 21, to detect the presence of an object within predetermined regions of the object detection field 32, as well as motion and velocity information about the object therewithin, and to generate control signals which are supplied to the system control subsystem 30 for indicating when and where an object is detected within the object detection field of the system. As shown in FIG. 2B, IR LED 90A and IR photodiode 90B are supported in the central lower portion of the optically-opaque structure 133, below the linear array of LEDs 23. The IR LED 90A and IR photodiode 90B are used to implement the automatic IR-based object motion detection and analysis subsystem 20.

The image formation and detection (i.e. camera) subsystem 21 includes: image formation (camera) optics 34 for providing a field of view (FOV) 33 upon an object to be imaged; and a CMOS area-type image detection array 35 for detecting imaged light reflected off the object during illumination and image acquisition/capture operations.

The primary function of the LED-based illumination subsystem 22 is to produce a wide-area illumination field 36 from the LED array 23 when an object is automatically detected within the FOV. Notably, the field of illumination has a narrow optical-bandwidth and is spatially confined within the FOV of the image formation and detection subsystem 21 during modes of illumination and imaging, respectively. This arrangement is designed to ensure that only narrow-band illumination transmitted from the illumination subsystem 22, and reflected from the illuminated object, is ultimately transmitted through a narrow-band transmission-type optical filter subsystem 40 within the system and reaches the CMOS area-type image detection array 35 for detection and processing. All other components of ambient light collected by the light collection optics are substantially rejected at the image detection array 35, thereby providing improved SNR, thus improving the performance of the system.

The narrow-band transmission-type optical filter subsystem 40 is realized by (1) a high-pass (i.e. red-wavelength reflecting) filter element embodied within the imaging window 3, and (2) a low-pass filter element mounted either before the CMOS area-type image detection array 35 or anywhere beyond the high-pass filter element, including being realized as a dichroic mirror film supported on at least one of the FOV folding mirrors 74 and 75, shown in FIGS. 2A and 2B.

As shown in FIG. 2B, the linear array of LEDs 23 is aligned with an illumination-focusing lens structure 130 embodied or integrated within the upper edge of the imaging window 3. Also, the light transmission aperture 60 formed in the PC board 8 is spatially aligned within the imaging window 3 formed in the front housing portion 2A. The function of illumination-focusing lens structure 130 is to focus illumination from the single linear array of LEDs 23, and to uniformly illuminate objects located anywhere within the working distance of the FOV of the system.

As shown in FIG. 2B, an optically-opaque light ray containing structure 133 is mounted to the front surface of the PC board 8, about the linear array of LEDs 23. The function of the optically-opaque light ray containing structure 133 is to prevent transmission of light rays from the LEDs to any surface other than the rear input surface of the illumination-focusing lens panel 3, which uniformly illuminates the entire FOV of the system over its working range. When the front and rear housing panels 2B and 2A are joined together, with the PC board 8 disposed therebetween, the illumination-focusing lens panel 3 sits within slanted cut-aways formed in the top surface of the side panels, and illumination rays produced from the linear array of LEDs 23 are either directed through the rear surface of the illumination-focusing lens panel 3 or absorbed by the black colored interior surface of the structure 133.

As shown in FIGS. 2A and 2B, the optical component support (OCS) assembly 78 comprises: a first inclined panel for supporting the FOV folding mirror 74 above the FOV forming optics, and a second inclined panel for supporting the second FOV folding mirror 75 above the light transmission aperture 60. With this arrangement, the FOV employed in the image formation and detection subsystem 21, and originating from optics supported on the rear side of the PC board, is folded twice, in space, and then projected through the light transmission aperture and out of the imaging window of the system.

The automatic illumination and exposure control subsystem 24 performs two primary functions, namely: (i) controls the operation of the LED-based illumination subsystem 22 so that that LED illumination array 23 generates stroboscopically-controlled (i.e. stroboscopic) pulses of illumination at a predetermined average energy level in synchronism with the exposure duration (i.e. photo-integration time period) set for the image detection array 35, and (ii) controls the exposure duration (i.e. photo-integration time period) set for the image detection array 35, as instructed by the system control subsystem 30 so that objects within the FOV of the system are optimally exposed to LED-based illumination and optimal high quality images are formed and detected at the image detection array 35, with a high level of system responsiveness. FIGS. 5 and 6, describe the precise manner in which the automatic illumination and exposure control subsystem 24 operates under the control of subsystem 30 in accordance with the first and second illustrative embodiments of the adaptive strobe illumination and exposure control process of the present disclosure.

The OCS assembly 78 also comprises a third support panel for supporting the parabolic light collection mirror segment 79 employed in the automatic exposure measurement and illumination control subsystem 24. Using this mirror 78, a narrow light collecting FOV is projected out into a central portion of the wide-area FOV 33 of the image formation and detection subsystem 21 and focuses collected light onto photo-detector 81, which is operated independently from the area-type image sensing array, schematically depicted in FIG. 3 by reference numeral 35.

The primary function of the image capturing and buffering subsystem 25 is (1) to detect the entire 2D image focused onto the 2D image detection array 35 by the image formation optics 34 of the system, (2) to generate a frame of digital pixel data for either a selected region of interest of the captured image frame, or for the entire detected image, and then (3) buffer each frame of image data as it is captured. Notably, in the illustrative embodiment, the system has both single-shot and video modes of imaging. In the single shot mode, a single 2D image frame (31) is captured during each image capture and processing cycle, or during a particular stage of a processing cycle as described in U.S. Pat. No. 7,841,533, incorporated herein by reference. In the video mode of imaging, the system continuously captures frames of digital images of objects in the FOV, as described in greater detail in FIGS. 5A through 5D and 6A through 6D.

The primary function of the digital image processing subsystem 26 is to process digital images that have been captured and buffered by the image capturing and buffering subsystem 25, during modes of illumination and operation. Such image processing operations include image-based bar code decoding methods as described in U.S. Pat. No. 7,128,266, incorporated herein by reference.

The primary function of the input/output subsystem 27 is to support universal, standard and/or proprietary data communication interfaces with external host systems and devices, and output processed image data and the like to such external host systems or devices by way of such interfaces. Examples of such interfaces, and technology for implementing the same, are given in U.S. Pat. Nos. 6,619,549 and 6,619,549, incorporated herein by reference in their entirety.

The primary function of the system control subsystem 30 is to provide some predetermined degree of control, coordination and/or management signaling services to each subsystem component integrated within the system, as shown. While this subsystem can be implemented by a programmed microprocessor, in the preferred embodiments this subsystem is implemented by the three-tier software architecture supported on a micro-computing platform, as described in U.S. Pat. No. 7,128,266, and elsewhere hereinafter.

The primary function of the manually-actuatable trigger switch 5 integrated with the housing is to enable the user, during a manually-triggered mode of operation, to generate a control activation signal (i.e. trigger event signal) upon manually depressing the same (i.e. causing a trigger event), and to provide this control activation signal to the system control subsystem 30 for use in carrying out its complex system and subsystem control operations, described in detail herein.

The primary function of the system configuration parameter table 29 in system memory is to store (in non-volatile/persistent memory) a set of system configuration and control parameters (i.e. SCPs) for each of the available features and functionalities, and programmable modes of supported system operation, and which can be automatically read and used by the system control subsystem 30 as required during its complex operations. Notably, such SCPs can be dynamically managed as taught in great detail in copending US Publication No. US20080314985 A1, incorporated herein by reference.

Figure 4:
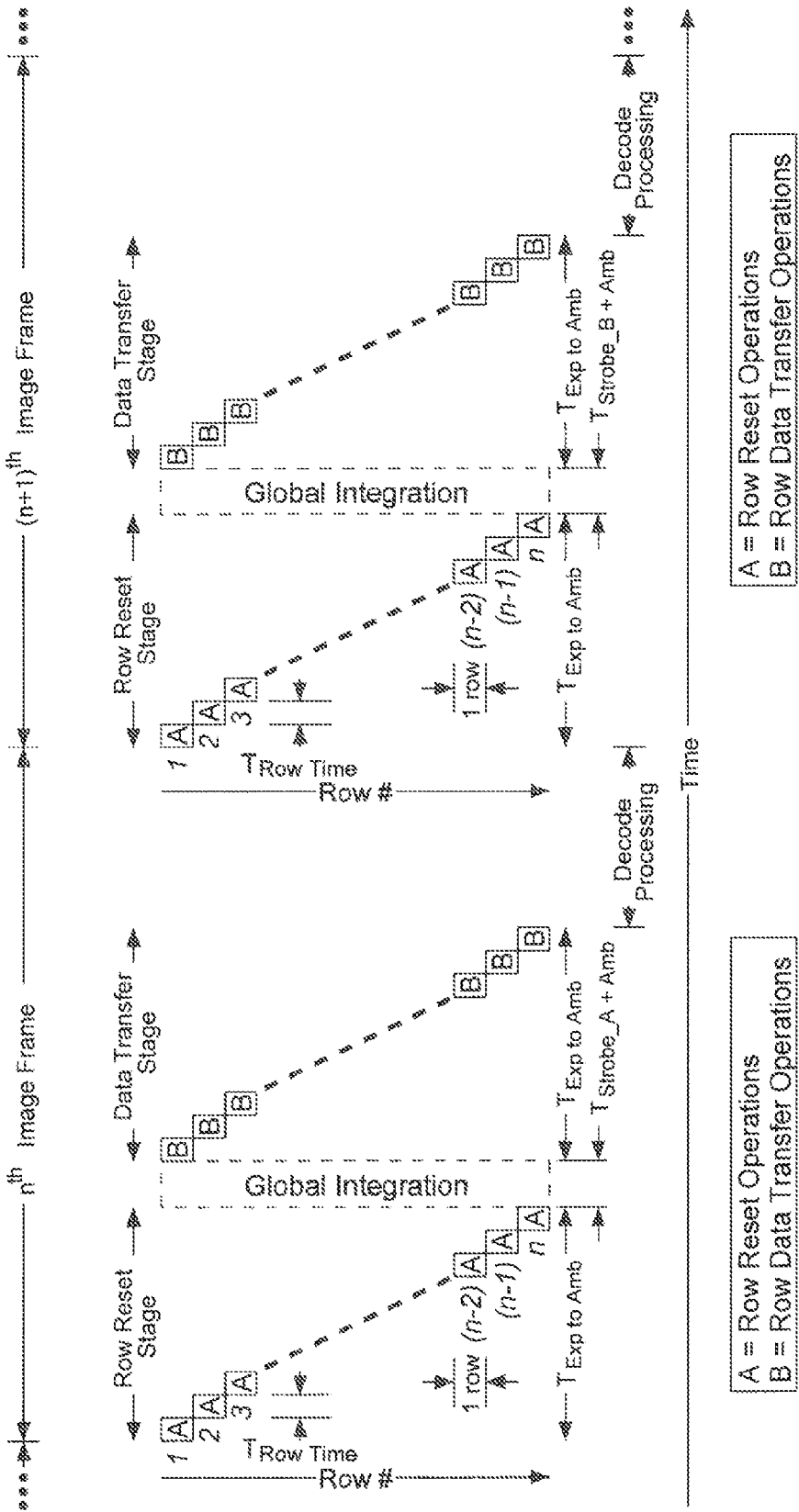
FIG. 4 is a schematic representation of the operation of the image detection array employed in its video mode of operation, while an object in its field of view (FOV) is being illuminated with stroboscopic illumination, and digital video images are being captured, according to the principles of the adaptive strobe illumination and exposure control process of the present disclosure.

FIG. 4 is illustrates the operation of the image detection array 23 when operated in its video mode of operation, while an object in its field of view (FOV) is being illuminated with stroboscopically-controlled pulses of illumination, and digital video images are being captured, according to the principles of the adaptive illumination and exposure control process of the present disclosure, to be described in greater technical detail hereinbelow.

The Adaptive Strobe Illumination and Exposure Control Process According to the First Illustrative Embodiment of the Present Disclosure FIGS. 5A through 5D describes the steps involved when carrying out the adaptive strobe illumination and exposure control process of the first illustrative embodiment. In general, the process involves: (i) illuminating an object in the field of view (FOV) with several different pulses of strobe (i.e. stroboscopic) illumination over a pair of consecutive image frames; (ii) detecting digital images of the illuminated object over these consecutive image frames; (iii) decode processing the digital images in effort to read a code symbol graphically encoded therein; and upon failure to do so, (iv) analyzing these digital images in real-time, and based on the results of this real-time image analysis, automatically adjusting the exposure time (i.e. photonic integration time interval) during subsequent image frames (i.e. image acquisition cycles) according to the principles of the present disclosure. This adaptive process will now be described in greater detail below.

Figure 5A:
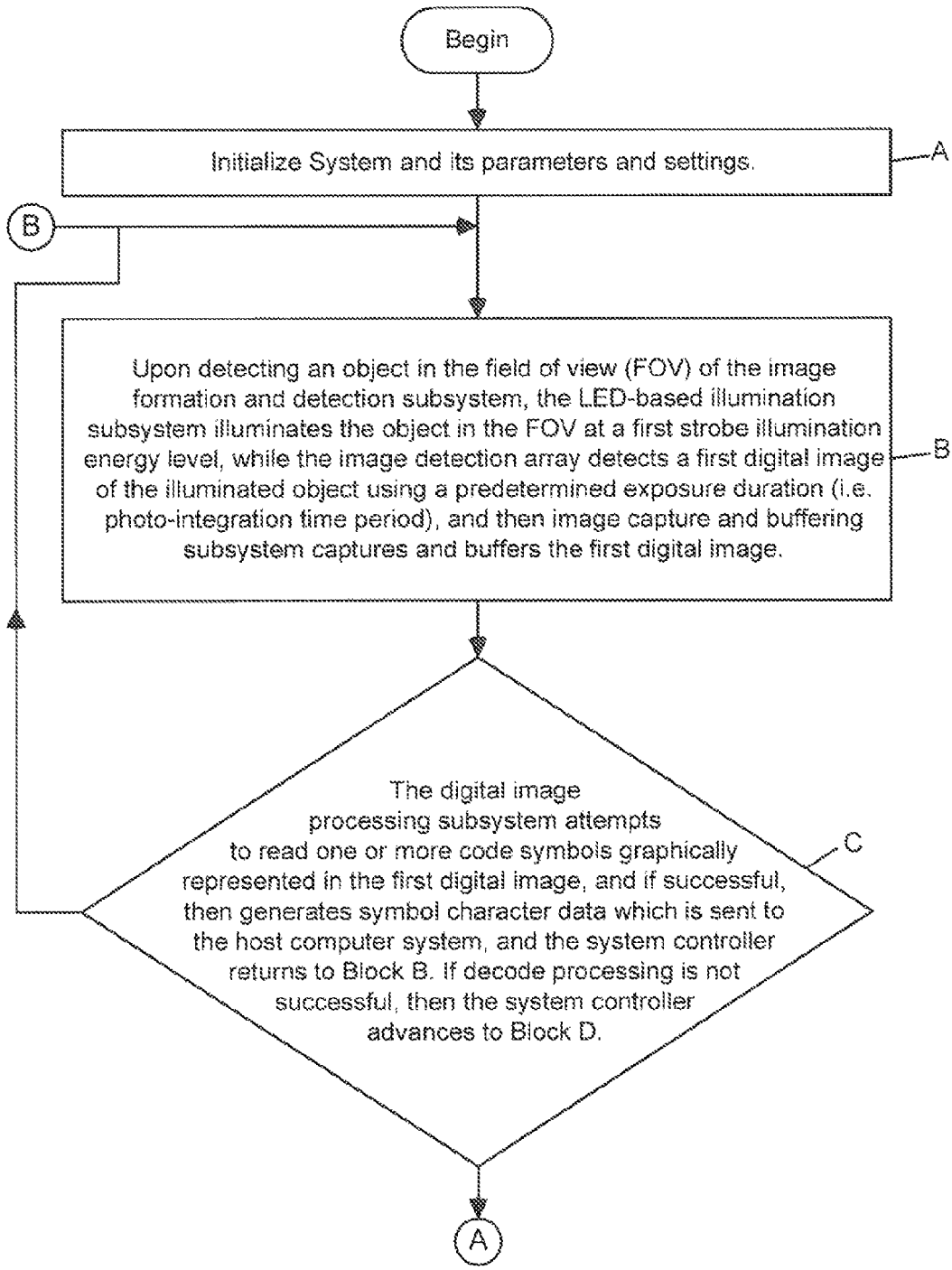
FIGS. 5A through 5D, taken together, provide a flow chart setting forth the steps involved in carrying out the adaptive strobe illumination control process of the first illustrative embodiment, involving (i) illuminating an object in the field of view (FOV) with several different strobe (i.e. stroboscopic) illumination pulses over a pair of consecutive image frames, (ii) detecting digital images of the illuminated object over these consecutive image frames, (iii) decode processing the digital images in an effort to read a code symbol graphically encoded therein, and upon failure to do so, (iv) analyzing these digital images, and based on the results of this real-time image analysis, automatically adjusting the exposure time (i.e. photonic integration time interval) during subsequent image frames (i.e. image acquisition cycles) according to the principles of the adaptive strobe illumination and exposure control process of the present disclosure.

As indicated at Block A of the flow chart of FIG. 5A, the first step involves initializing the System and its parameters and settings.

As indicated at Block B, upon detecting an object in the field of view (FOV) of the image formation and detection subsystem, the LED-based illumination subsystem illuminates the object in the FOV at a first strobe illumination energy level, while the image detection array detects a first digital image of the illuminated object using a predetermined exposure duration (i.e. photo-integration time period), and then the image capture and buffering subsystem captures and buffers the first digital image.

As indicated at Block C, the digital image processing subsystem attempts to read one or more code symbols graphically represented in the first digital image, and if successful, then generates symbol character data, which is sent to the host computer system, and the system controller returns to Block B. If decode processing is not successful, then the system controller advances to Block D.

Figure 5B:
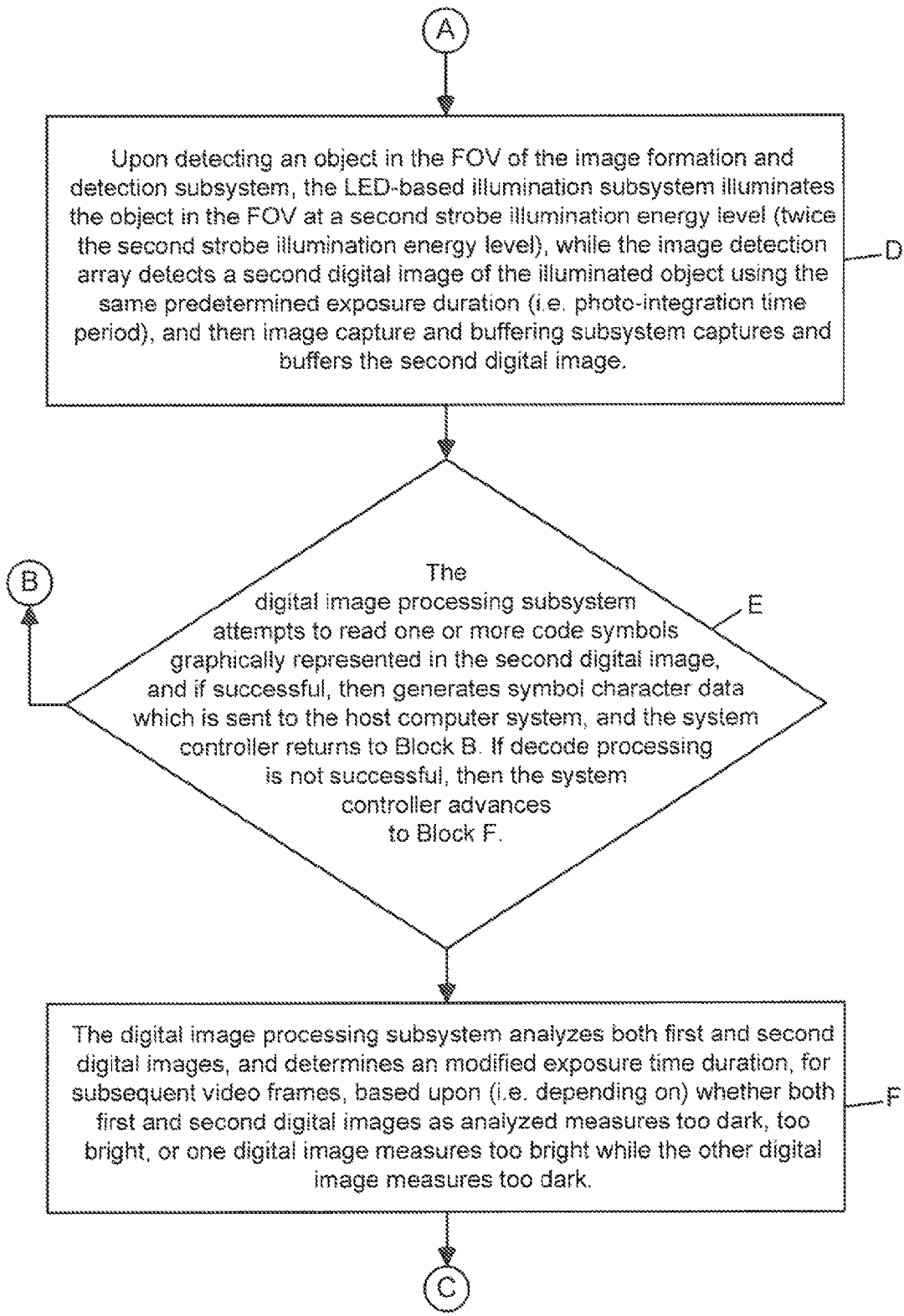
Figure 5C:
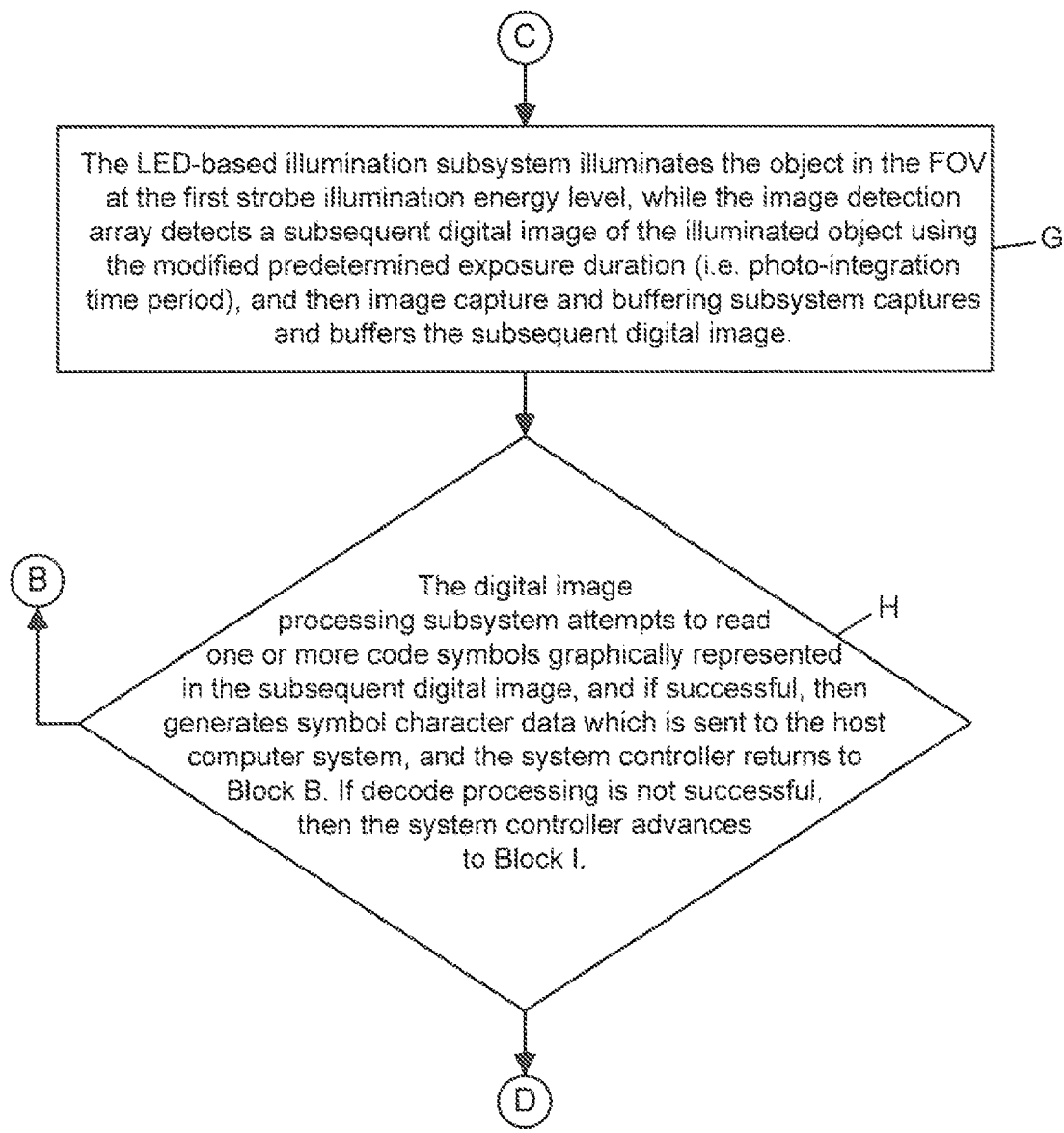
Figure 5D:
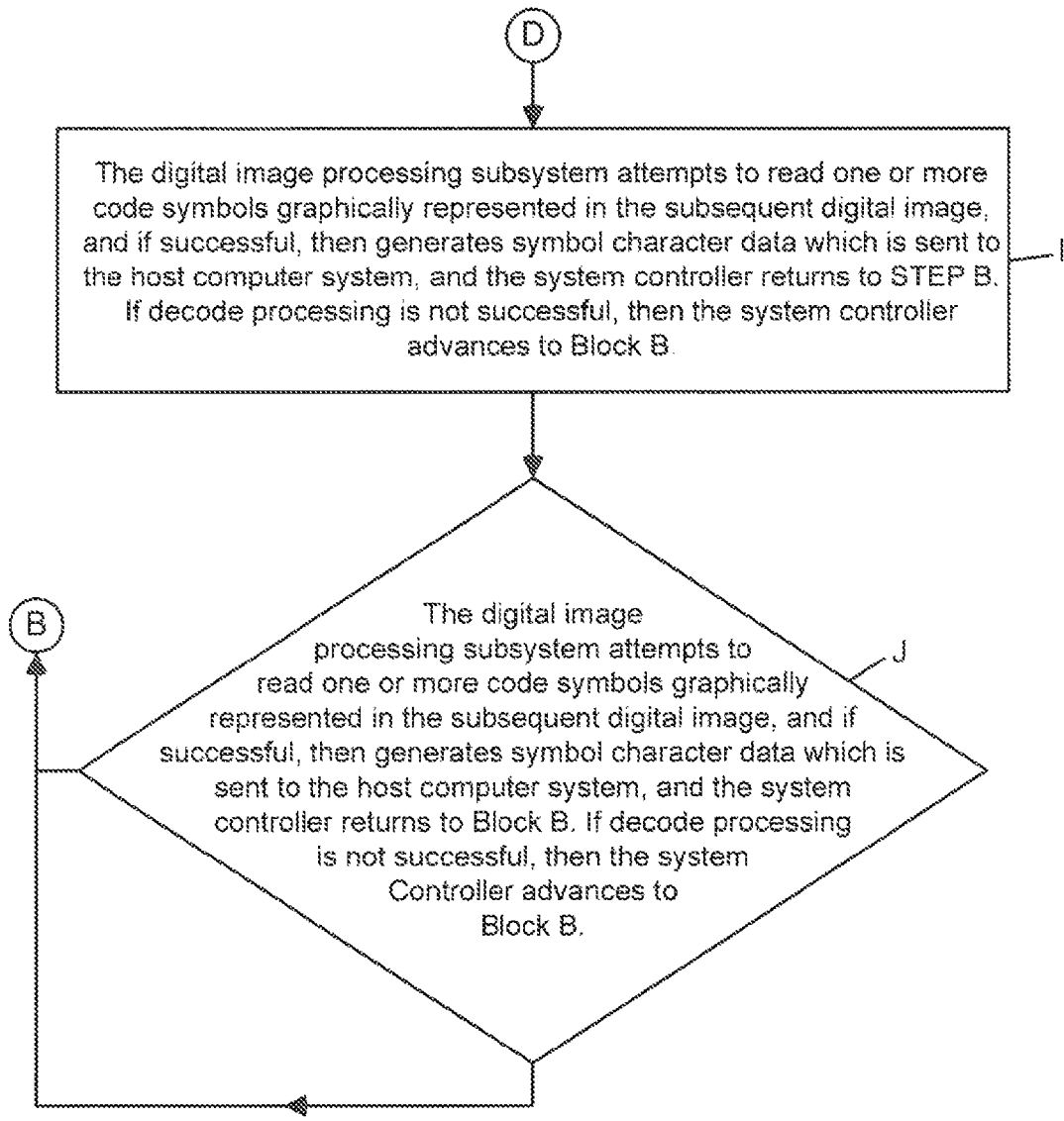

As indicated at Block D in FIG. 5B, upon detecting an object in the FOV of the image formation and detection subsystem, the LED-based illumination subsystem illuminates the object in the FOV at a second strobe illumination energy level (twice the second strobe illumination energy level), while the image detection array detects a second digital image of the illuminated object using the same predetermined exposure duration (i.e. photo-integration time period), and then the image capture and buffering subsystem captures and buffers the second digital image.

As indicated at Block E, the digital image processing subsystem attempts to read one or more code symbols graphically represented in the second digital image, and if successful, then generates symbol character data which is sent to the host computer system, and the system controller returns to Block A. If decode processing is not successful, then the system controller advances to Block F.

As indicated at Block F, the digital image processing subsystem analyzes both first and second digital images, and determines a modified exposure time duration, for subsequent video frames, based upon (i.e. depending on) whether both first and second digital images as analyzed measures too dark, too bright, or one digital image measures too bright while the other digital image measures too dark.

As indicated at Block G in FIG. 5G, the LED-based illumination subsystem illuminates the object in the FOV at the first strobe illumination energy level, while the image detection array detects a subsequent digital image of the illuminated object using the modified predetermined exposure duration (i.e. photo-integration time period), and then the image capture and buffering subsystem captures and buffers the subsequent digital image.

As indicated at Block H, the digital image processing subsystem attempts to read one or more code symbols graphically represented in the subsequent digital image, and if successful, then generates symbol character data, which is sent to the host computer system, and the system controller returns to Block B. If decode processing is not successful, then the system controller advances to Block I.

As indicated at Block I in FIG. 5I, the LED-based illumination subsystem illuminates the object in the FOV at the second strobe illumination energy level, while the image detection array detects a subsequent digital image of the illuminated object using the modified predetermined exposure duration (i.e. photo-integration time period), and then the image capture and buffering subsystem captures and buffers the subsequent digital image.

As indicated at Block J, the digital image processing subsystem attempts to read one or more code symbols graphically represented in the subsequent digital image, and if successful, then generates symbol character data which is sent to the host computer system, and the system controller returns to Block A. If decode processing is not successful, then the system controller advances to Block A.

The adaptive strobe illumination and exposure control process specified above is carried by the system control subsystem 30 in an automated manner, so that the digital-imaging based code symbol reading system supports an improved level of image acquisition responsiveness.

The Adaptive Strobe Illumination and Exposure Control Process of According to the Second Illustrative Embodiment of the Present Disclosure FIGS. 6A through 6D describes the steps involved when carrying out the adaptive strobe illumination and exposure control process of the second illustrative embodiment. In general, the process involves: (i) illuminating an object in the field of view (FOV) with several different strobe (i.e. stroboscopic) illumination pulses over a pair of consecutive image frames; (ii) detecting digital images of the illuminated object over these consecutive image frames; (iii) decode processing the digital images in an effort to read a code symbol graphically encoded therein; and upon failure to do so, (iv) analyzing these digital images in real-time, and based on the results of this real-time image analysis, automatically adjusting the energy level of the strobe illumination during subsequent image frames (i.e. image acquisition cycles) according to the principles of the present disclosure. This adaptive process will now be described in greater detail below.

Figure 6A:
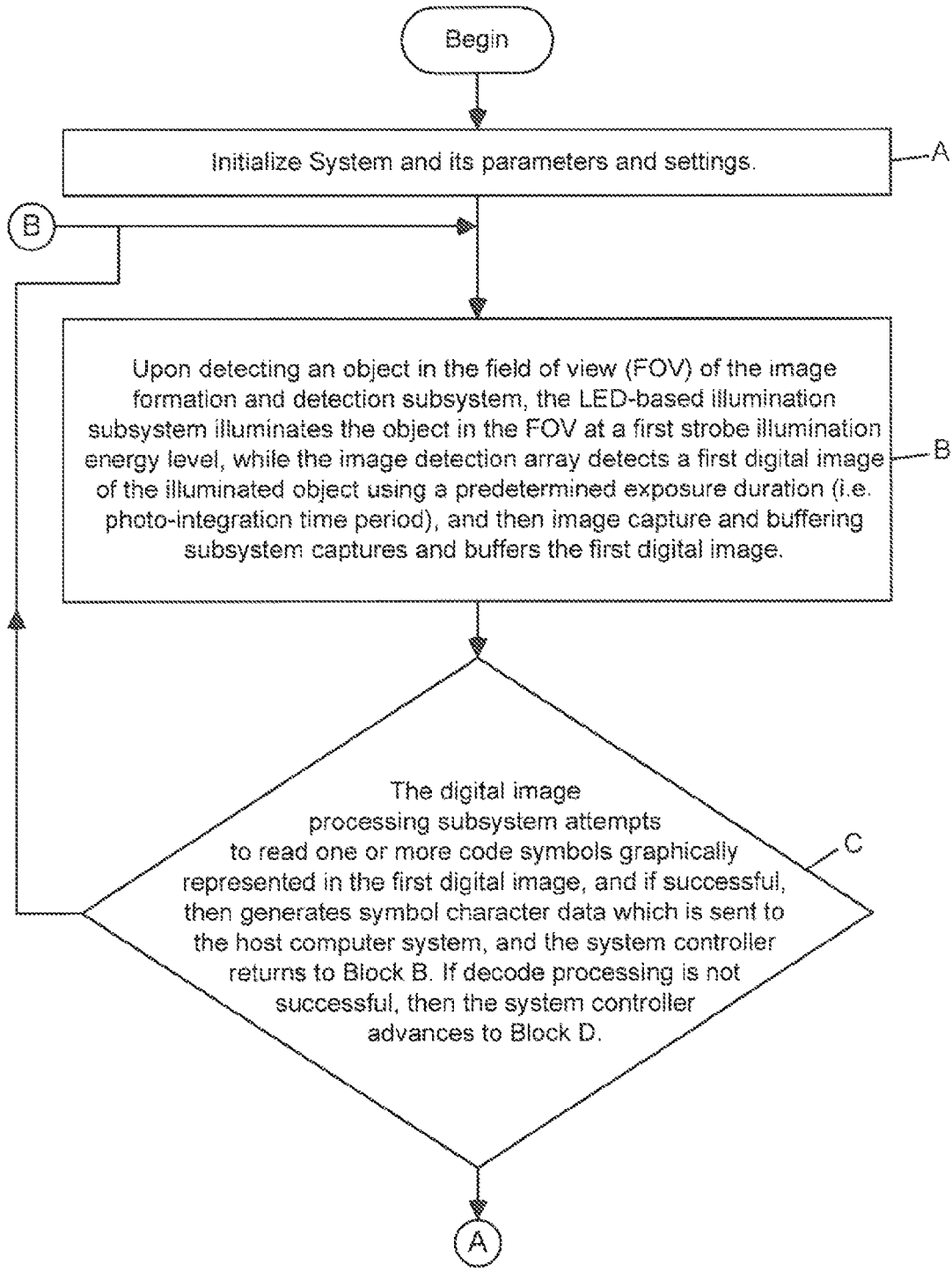
FIGS. 6A through 6D, taken together, provide a flow chart setting forth the steps involved in carrying out the adaptive strobe illumination control process of the second illustrative embodiment, involving (i) illuminating an object in the field of view (FOV) with several different strobe (i.e. stroboscopic) illumination pulses over a pair of consecutive image frames, (ii) detecting digital images of the illuminated object over these consecutive image frames, (iii) decode processing the digital images in effort to read a code symbol graphically encoded therein, and upon failure to do so, (iv) analyzing these digital images, and based on the results of this real-time image analysis, automatically adjusting the energy level of the strobe illumination during subsequent image frames (i.e. image acquisition cycles) according to the principles of the adaptive strobe illumination and exposure control process of the present disclosure.

As indicated at Block A of the flow chart of FIG. 6A, the first step involves initializing the System and its parameters and settings.

At Block B, upon detecting an object in the field of view (FOV) of the image formation and detection subsystem, the LED-based illumination subsystem illuminates the object in the FOV at a first strobe illumination energy level, while the image detection array detects a first digital image of the illuminated object using a predetermined exposure duration (i.e. photo-integration time period), and then image capture and buffering subsystem captures and buffers the first digital image.

At Block C, the digital image processing subsystem attempts to read one or more code symbols graphically represented in the first digital image, and if successful, then generates symbol character data which is sent to the host computer system, and the system controller returns to Block B. If decode processing is not successful, then the system controller advances to Block D.

Figure 6B:
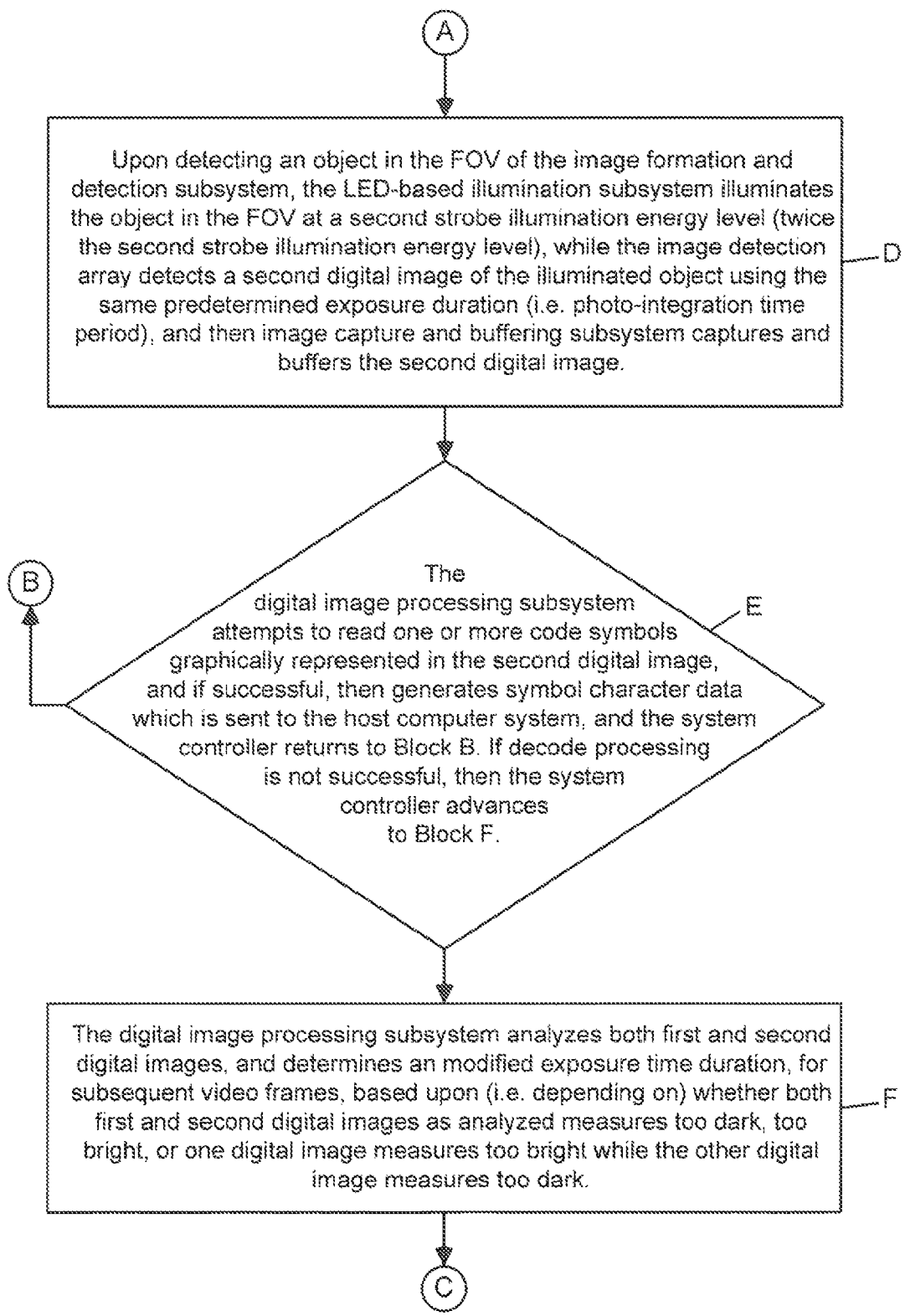

At Block D in FIG. 6B, upon detecting an object in the FOV of the image formation and detection subsystem, the LED-based illumination subsystem illuminates the object in the FOV at a second strobe illumination energy level (twice the second strobe illumination energy level), while the image detection array detects a second digital image of the illuminated object using the same predetermined exposure duration (i.e. photo-integration time period), and then the image capture and buffering subsystem captures and buffers the second digital image.

At Block E, the digital image processing subsystem attempts to read one or more code symbols graphically represented in the second digital image, and if successful, then generates symbol character data which is sent to the host computer system, and the system controller returns to Block B. If decode processing is not successful, then the system controller advances to Block F.

As indicated at Block F, the digital image processing subsystem analyzes both first and second digital images, and determines a modified exposure time duration, for subsequent video frames, based upon (i.e. depending on) whether both first and second digital images as analyzed measure too dark, too bright, or one digital image measures too bright while the other digital image measures too dark.

Figure 6C:
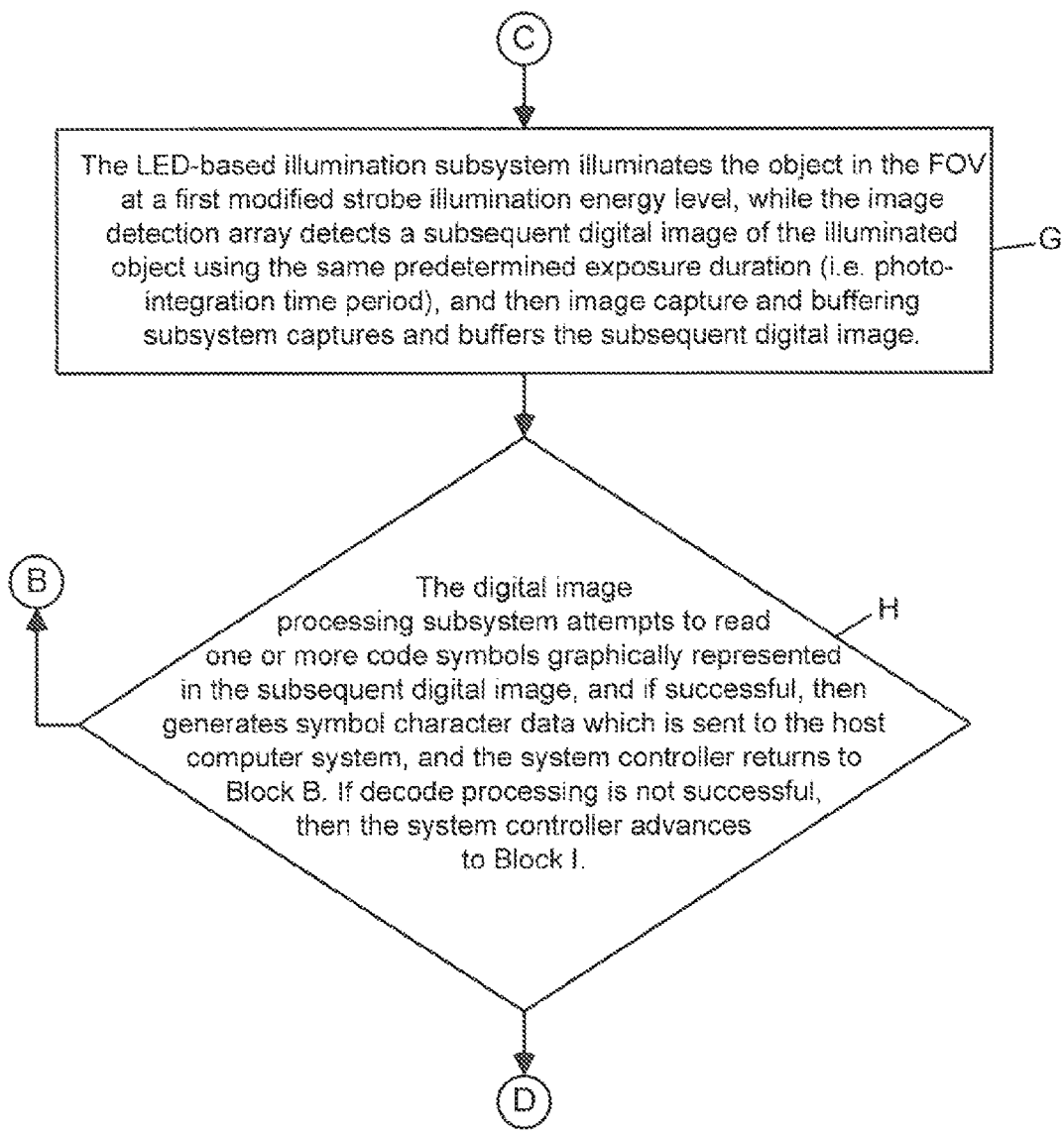

As indicated at Block G in FIG. 6C, the LED-based illumination subsystem illuminates the object in the FOV at a first modified strobe illumination energy level, while the image detection array detects a subsequent digital image of the illuminated object using the same predetermined exposure duration (i.e. photo-integration time period), and then the image capture and buffering subsystem captures and buffers the subsequent digital image.

Figure 6D:
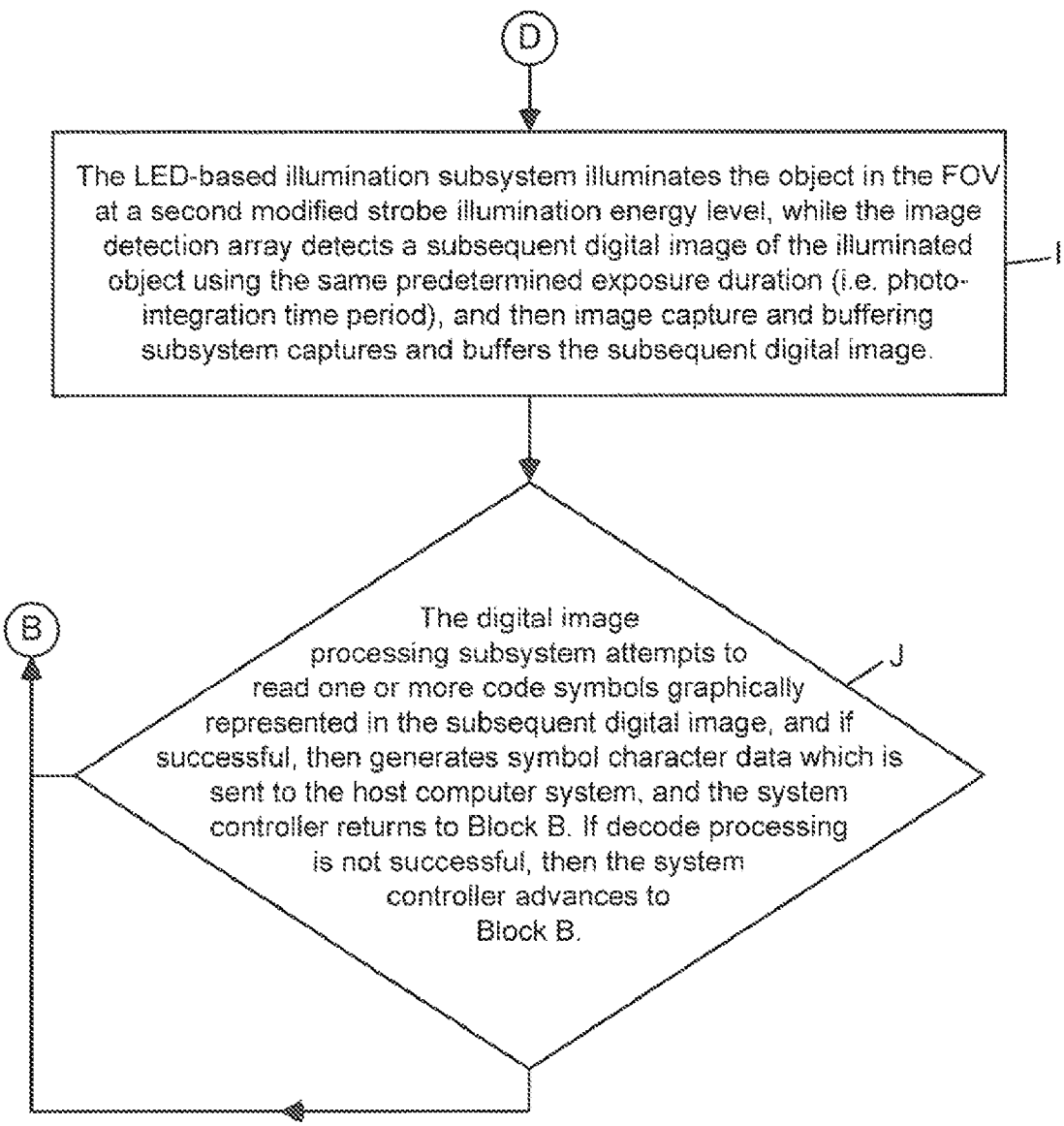

As indicated at Block H in FIG. 6D, the digital image processing subsystem attempts to read one or more code symbols graphically represented in the subsequent digital image, and if successful, then generates symbol character data which is sent to the host computer system, and the system controller returns to Block B. If decode processing is not successful, then the system controller advances to Block I.

As indicated at Block I in FIG. 6D, the LED-based illumination subsystem illuminates the object in the FOV at a second modified strobe illumination energy level, while the image detection array detects a subsequent digital image of the illuminated object using the same predetermined exposure duration (i.e. photo-integration time period), and then image capture and buffering subsystem captures and buffers the subsequent digital image.

As indicated at Block J in FIG. 6D, the digital image processing subsystem attempts to read one or more code symbols graphically represented in the subsequent digital image, and if successful, then generates symbol character data which is sent to the host computer system, and the system controller returns to Block B. If decode processing is not successful, then the system controller advances to Block B.

The above-described adaptive strobe illumination and exposure control process is carried out by the system control subsystem 30 in an automated manner, so that the digital-imaging based code symbol reading system supports an improved level of image acquisition responsiveness.

Some Modifications which Come to Mind

While the illustrative embodiments of the present invention have been described in connection with various types of bar code symbol reading applications involving 1-D and 2-D bar code structures, it is understood that the present invention can be used to read (i.e. recognize) any machine-readable indicia, dataform, or graphically-encoded form of intelligence, including, but not limited to bar code symbol structures, alphanumeric character recognition strings, handwriting, and diverse dataforms currently known in the art or to be developed in the future. Hereinafter, the term "code symbol"

shall be deemed to include all such information carrying structures and other forms of graphically-encoded intelligence.

Also, digital imaging systems of the illustrative embodiments can also be used to capture and process (i.e. recognize) various kinds of graphical images including photos and marks printed on driver licenses, permits, credit cards, debit cards, or the like, in diverse user applications.

It is understood that the digital image capture and processing technology employed in bar code symbol reading systems of the illustrative embodiments may be modified in a variety of ways which will become readily apparent to those skilled in the art and having the benefit of the novel teachings disclosed herein. All such modifications and variations of the illustrative embodiments thereof shall be deemed to be within the scope of the claims appended hereto.

The invention claimed is:

1. A method of adaptively controlling strobe illumination processes within a digital image capture and processing system supporting an improved level of image acquisition responsiveness, said method comprising the steps of:
   (a) providing a digital image capture and processing system including a housing having a light transmission aperture, and containing an image formation and detection subsystem with an image detection array with a video image capture mode, an illumination subsystem with an illumination array, an automatic illumination control subsystem, an image capturing and buffering subsystem, a digital image processing subsystem, and an input/output subsystem interfaced to a host system;
   (b) upon detecting an object in the field of view (FOV) of said image formation and detection subsystem, said illumination subsystem illuminates the object in the FOV at a first strobe illumination energy level, while said image detection array is detecting a first digital image of the illuminated object using a predetermined exposure duration, and then said image capture and buffering subsystem capturing and buffering said first digital image;
   (c) said digital image processing subsystem attempting to read one or more code symbols graphically represented in the first digital image, and if successful, then generating symbol character data which is sent to said host system, and returning to step (b); and if decode processing is not successful, then advancing to step (d);
   (d) upon detecting an object in the FOV of said image formation and detection subsystem, said illumination subsystem illuminates the object in said FOV at a second strobe illumination energy level, substantially greater than said first strobe illumination energy level, while said image detection array is detecting a second digital image of the illuminated object using the same predetermined exposure duration, and then said image capture and buffering subsystem capturing and buffering said second digital image; and
   (e) said digital image processing subsystem attempting to read one or more code symbols graphically represented in said second digital image, and if successful, then generating symbol character data which is sent to said host system, and returning to step (b), and if decode processing is not successful, then advancing to step (f);
   (f) said digital image processing subsystem analyzing both said first and second digital images, and determining a modified exposure time duration, for subsequent video frames, based upon whether both said first and second digital images as analyzed measures too dark, too bright, or one digital image measures too bright while the other digital image measures too dark;
   (g) said illumination subsystem illuminating the object in said FOV at the first strobe illumination energy level, while said image detection array is detecting a first subsequent digital image of the illuminated object using said modified predetermined exposure duration, and then said image capture and buffering subsystem capturing and buffering said first subsequent digital image; and
   (h) said digital image processing subsystem attempting to read one or more code symbols graphically represented in said first subsequent digital image, and if successful, then generating symbol character data which is sent to said host system, and returning to step (b).

2. The method of claim 1, which further comprises:
   (i) if decode processing is not successful in step (h), then said illumination subsystem illuminating the object in the FOV at said second strobe illumination energy level, substantially greater than said first strobe illumination energy level, while said image detection array is detecting a second subsequent digital image of the illuminated object using the modified predetermined exposure duration, and then said image capture and buffering subsystem capturing and buffering the second subsequent digital image; and
   (j) said digital image processing subsystem attempting to read one or more code symbols graphically represented in the second subsequent digital image, and if successful, then generates symbol character data which is sent to said host system, and returning to step (b).

3. The method of claim 2, which further comprises:
   (k) if decode processing is not successful in step (j), then returning to step (b).

4. The method of claim 1, wherein said code symbol is a code symbol selected from the group consisting of 1D bar code symbologies, 2D bar code symbologies, and data matrix symbologies.

5. The method of claim 1, wherein said image detection array is an area-type image detection array.

6. The method of claim 5, wherein said area-type image detection array is a CMOS-type area-type image detection array.

7. A method of adaptively controlling strobe illumination processes within a digital image capture and processing system supporting an improved level of image acquisition responsiveness, said method comprising the steps of:
   (a) providing a digital image capture and processing system including a housing having a light transmission aperture, and containing an image formation and detection subsystem with an image detection array with a video image capture mode, an illumination subsystem with an illumination array, an automatic illumination and exposure control subsystem, an image capturing and buffering subsystem, a digital image processing subsystem, and an input/output subsystem interfaced to a host system;
   (b) said illumination subsystem illuminating the object in the FOV at a first strobe illumination energy level, while said image detection array is detecting a first digital image of the illuminated object using a predetermined exposure duration, and then said image capture and buffering subsystem capturing and buffering said first digital image;
   (c) said digital image processing subsystem attempting to read one or more code symbols graphically represented in the first digital image, and if successful, then generating symbol character data which is sent to said host system, and returning to step (b); and if decode processing is not successful, then advancing to step (d);

(d) said illumination subsystem illuminates the object in said FOV at a second strobe illumination energy level, substantially greater than said first strobe illumination energy level, while said image detection array detects a second digital image of the illuminated object using the same predetermined exposure duration, and then said image capturing and buffering subsystem captures and buffers said second digital image; and (e) said digital image processing subsystem attempting to read one or more code symbols graphically represented in said second digital image, and if successful, then generating symbol character data which is sent to said host system, and returning to step (b), and if decode processing is not successful, then advancing to step (f);

(f) said digital image processing subsystem analyzing said first and second digital images, and determining a modified exposure time duration, for subsequent video frames, based upon whether said first and second digital images as analyzed measures too dark, too bright, or one digital image measures too bright while the other digital image measures too dark;

(g) said illumination subsystem illuminating the object in the FOV at a first modified strobe illumination energy level, while said image detection array detects a first subsequent digital image of the illuminated object using the same predetermined exposure duration, and then said image capture and buffering subsystem capturing and buffering said first subsequent digital image; and (h) said digital image processing subsystem attempting to read one or more code symbols graphically represented in said first subsequent digital image, and if successful, then generating symbol character data which is sent to said host system, and returning to step (b).

8. The method of claim 7, which further comprises:

(i) if decode processing is not successful in step (h), then said illumination subsystem illuminates the object in the FOV at a second modified strobe illumination energy level, while said image detection array detects a second subsequent digital image of the illuminated object using the same predetermined exposure duration, and then said image capture and buffering subsystem captures and buffers said second subsequent digital image; and (j) said digital image processing subsystem attempting to read one or more code symbols graphically represented in said second subsequent digital image, and if successful, then generating symbol character data which is sent to said host system, and returning to step (b).

9. The method of claim 8, which further comprises:

(k) if decode processing is not successful in step (j), then returning to step (b).

10. The method of claim 7, wherein said code symbol is a code symbol selected from the group consisting of 1D bar code symbologies, 2D bar code symbologies, and data matrix symbologies.

11. The method of claim 7, wherein said image detection array is an area-type image detection array.

12. The method of claim 11, wherein said area-type image detection array is a CMOS-type area-type image detection array.

13. The method of claim 7, wherein step (b) further comprises said illumination subsystem illuminating the object in the FOV at said first strobe illumination energy level upon detecting an object in the field of view (FOV) of said image formation and detection subsystem; and wherein step (d) further comprises said illumination subsystem illuminates the object in said FOV at said second strobe illumination energy level upon detecting an object in the FOV of said image formation and detection subsystem.

* * * * *